(12) United States Patent
Alexandrou

(10) Patent No.: US 8,696,895 B2
(45) Date of Patent: Apr. 15, 2014

(54) PERCOLATION FILTERING SYSTEM

(75) Inventor: Olga Alexandrou, Nicosia (CY)

(73) Assignee: Laica S.p.A., Barbarano Vicentino (VI) (IT)

( * ) Notice: Subject to any disclaimer, the term of this patent is extended or adjusted under 35 U.S.C. 154(b) by 741 days.

(21) Appl. No.: 12/671,059

(22) PCT Filed: Jul. 31, 2007

(86) PCT No.: PCT/EP2007/006831
§ 371 (c)(1),
(2), (4) Date: May 2, 2010

(87) PCT Pub. No.: WO2009/015679
PCT Pub. Date: Feb. 5, 2009

(65) Prior Publication Data
US 2010/0307986 A1      Dec. 9, 2010

(51) Int. Cl.
*B01D 35/143*      (2006.01)
*C02F 1/00*      (2006.01)

(52) U.S. Cl.
USPC .............................. 210/91; 210/110; 210/464

(58) Field of Classification Search
USPC ......... 210/464, 465, 466, 467, 468, 469, 473, 210/474, 475, 476, 477, 482, 85, 91, 100, 210/109, 110, 739, 767, 800
See application file for complete search history.

(56) References Cited

U.S. PATENT DOCUMENTS

| | | | |
|---|---|---|---|
| 6,881,327 B2 * | 4/2005 | Tanner et al. | 210/85 |
| 7,850,859 B2 * | 12/2010 | Tanner et al. | 210/767 |
| 8,216,451 B2 * | 7/2012 | Walde et al. | 210/109 |
| 8,298,408 B2 * | 10/2012 | Moretto | 210/109 |
| 2002/0082746 A1 | 6/2002 | Schubring et al. | |
| 2007/0209981 A1 * | 9/2007 | Moretto | 210/121 |

FOREIGN PATENT DOCUMENTS

WO     03/070351 A1     8/2003
WO     2006/136409 A1     12/2006

OTHER PUBLICATIONS

ISR in PCT application PCT/EP2007/006831.
Written Opinion in PCT application PCT/EP2007/006831.

* cited by examiner

*Primary Examiner* — Duane Smith
*Assistant Examiner* — Paul J Durand
(74) *Attorney, Agent, or Firm* — Kristina Castellano Castellano PLLC

(57) ABSTRACT

A percolation filtering system comprises a flow path of the water to be filtered including a filter cartridge seat (4) for removably receiving a filter cartridge (5) so that said flow path extends through said filter cartridge when said filter cartridge is inserted into said seat, characterized in that it comprises recognition means and counter-means of the suitability of said cartridge, respectively on said cartridge and said seat, suitable for reciprocal interaction when the cartridge is inserted in the seat to enable operation of the filtering system following the cartridge's suitability recognition, or to disable it or signal the suitability/unsuitability respectively of the cartridge if the cartridge is recognized/ not recognized respectively by the recognition means.

5 Claims, 4 Drawing Sheets

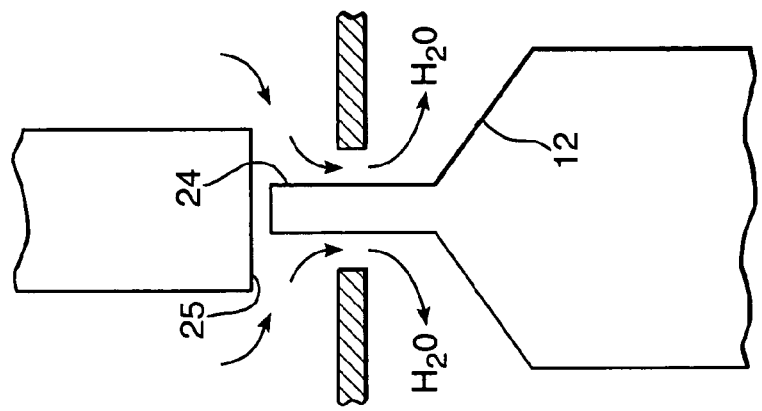
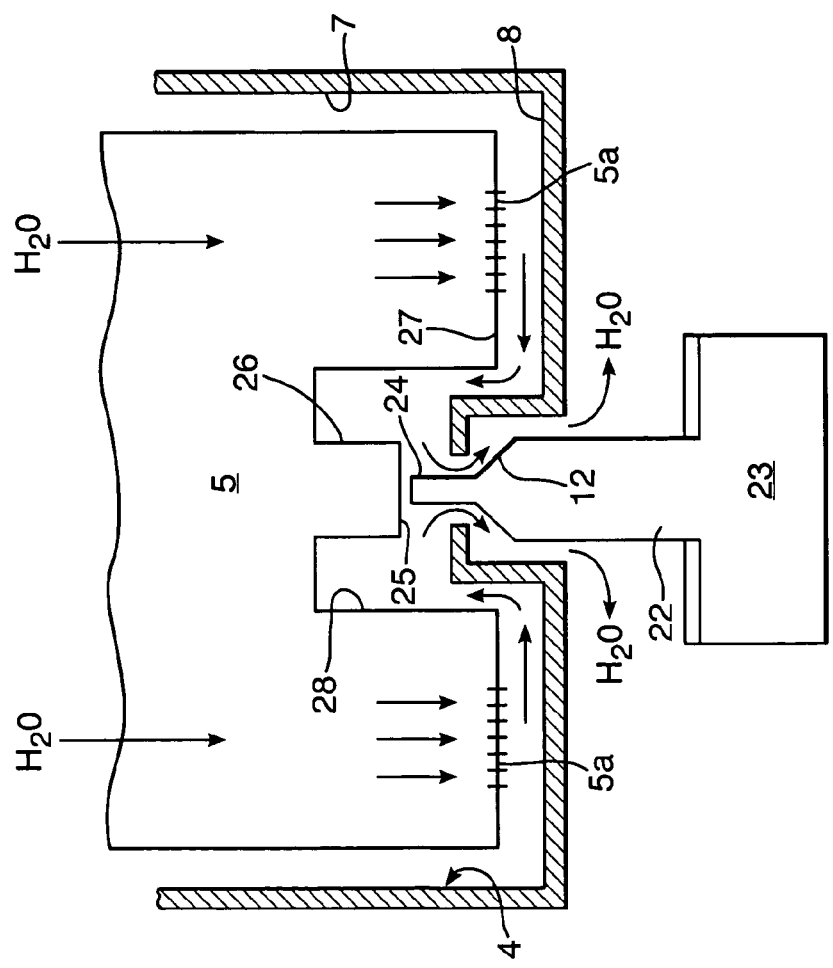
Fig.3.

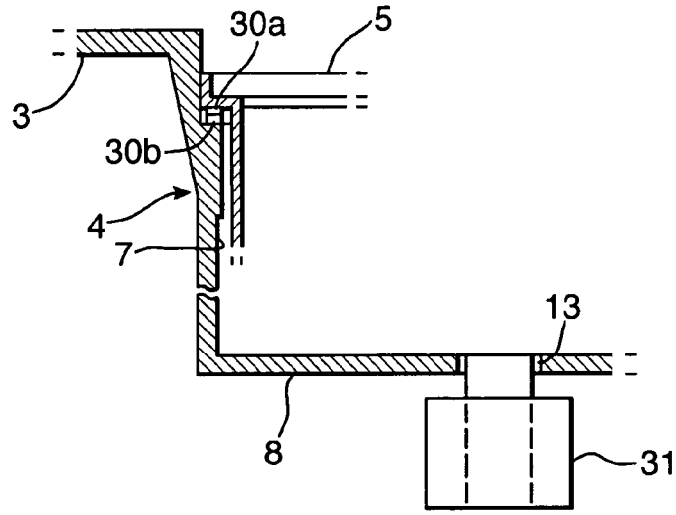
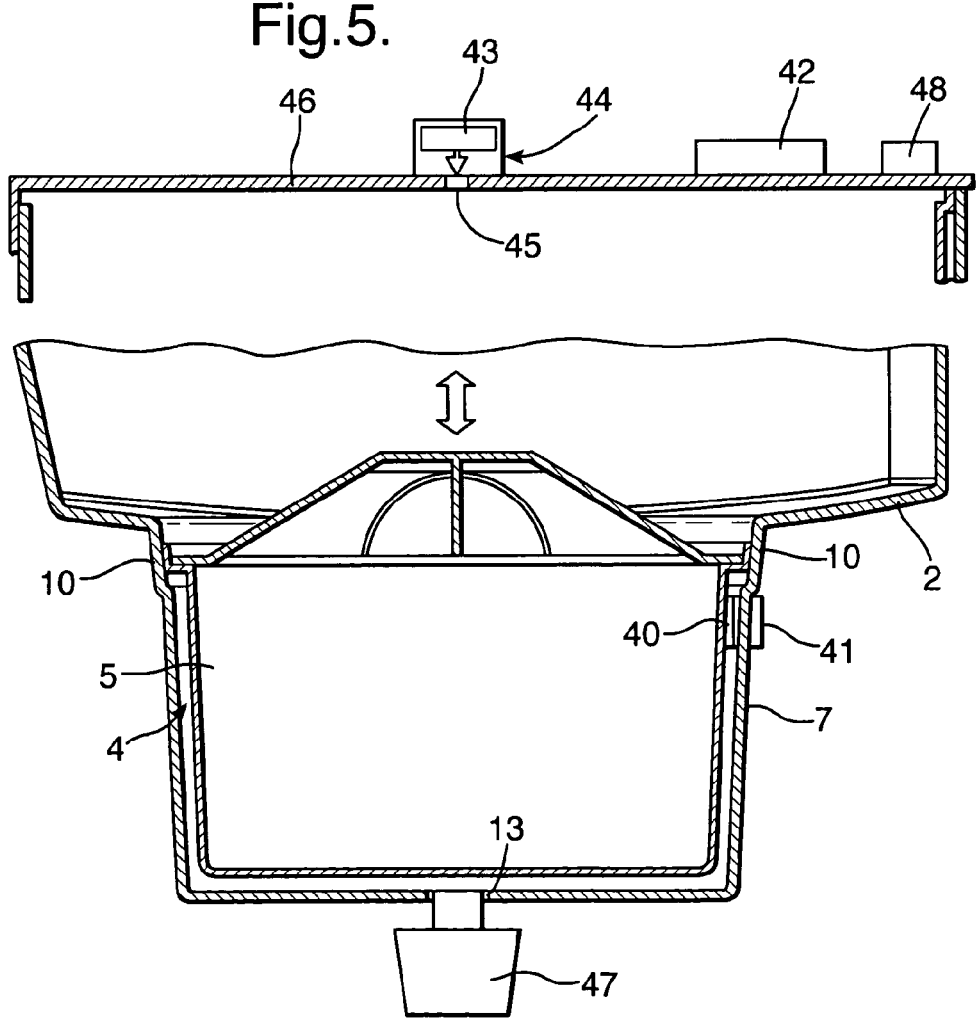

PERCOLATION FILTERING SYSTEM

CLAIM FOR PRIORITY

This application is a U.S. National Stage Application of PCT/EP2007/006831 filed on Jul. 31, 2007, the contents of which are hereby incorporated herein by reference.

The present invention regards a filtering system of the so-called "percolation" type with replaceable filtering cartridge. The filtering system is of the type wherein a liquid to be filtered is made to pass, generally by gravity, along a path extending through a filtering bed arranged in a filter cartridge.

Systems of this type are traditionally used in filtering jugs, boilers, coffee-makers and infusers for domestic use. The liquid to be filtered (water) is to normally poured in a first basin having in its bottom a seat for the filtering cartridge, and is subject to flow into a second basin below the first one by passing through the filtering bed.

Since the drinkable water which is provided by the various distribution networks varies macroscopically from one place to another, there is the need to prearrange adapted and specific filtering systems for the various pollutant types. For example, there are some places in which the distributed water has an unpleasant taste (and smell) of chloride, or waters containing nitrates, carbonates or other types of dissolved saline ions whose removal requires selective cartridges.

It is nearly impossible to produce a cartridge which is advantageously selective towards all these elements and at the same time has a reasonably limited size. The trend is therefore that of choosing differentiated filtering bed formulations, suitable for the particular type of water to be treated. As an example, the following formulation can be mixed in a same cartridge; weak anionic resins, strong anionic resins, weak cationic resins, strong cationic resins, active carbon (with different granulometries and with different silver content for the bacteriostatic effect), specific resins for removing arsenic or mercury, charged ceramic beads, etc. . . . so as to obtain appropriately selective cartridges.

With the technical evolution of the filtering cartridges, there is nevertheless the problem of ensuring the user that the cartridge used in his carafe is suitable for the desired purpose, both qualitatively and by typology. Since the cartridges, even those of different brands, are shaped rather similar to each other, it is necessary to operate on the carafe-cartridge filtering to system so as to prevent a cartridge deemed unsuitable or not sufficiently tested by the manufacturer of the carafe from being admitted in the carafe and used in place of the original one.

Currently, carafes are provided with a seat for the filtering cartridge whose geometry involves obstacles for the insertion of non-original cartridges. Examples are disclosed in EP1230166 and WO2005118104. It is possible, however, to make cartridges whose geometry allows overcoming the obstacles provided, such that the cartridges deemed unsuitable can in any case be inserted in substitution of those that are considered suitable for the purpose. This leads to the possibility that the filtered water is qualitatively worse than the user's expectations, and thus the entire (carafe-cartridge) filtering system is discredited in the eyes of the public, notwithstanding the fact that the cause of the defect depends on the cartridge only.

The technical problem underlying the present invention is therefore that of making available a filtering system and related control method which is structurally and functionally conceived for overcoming the drawbacks lamented with reference to the cited prior art.

The solutive idea of this problem is that of preventing that the filtering system can operate or at least signalling an operation error if the cartridge inserted in the seat is deemed unsuitable for the set purpose. In a preferred embodiment of the invention the filtering path of the liquid to be treated is intercepted if the cartridge used is not recognised by the system as suitable for such purpose.

This problem is resolved by the invention with a filtering system made in accordance with the following claims.

The characteristics and advantages of the invention will become more evident from the detailed description of several preferred but not exclusive embodiments thereof, given as non-limiting examples with reference to the attached drawings wherein:

FIGS. 3 to 5 represent section views of further alternative embodiment of the system of FIG. 1.

Figure 1:
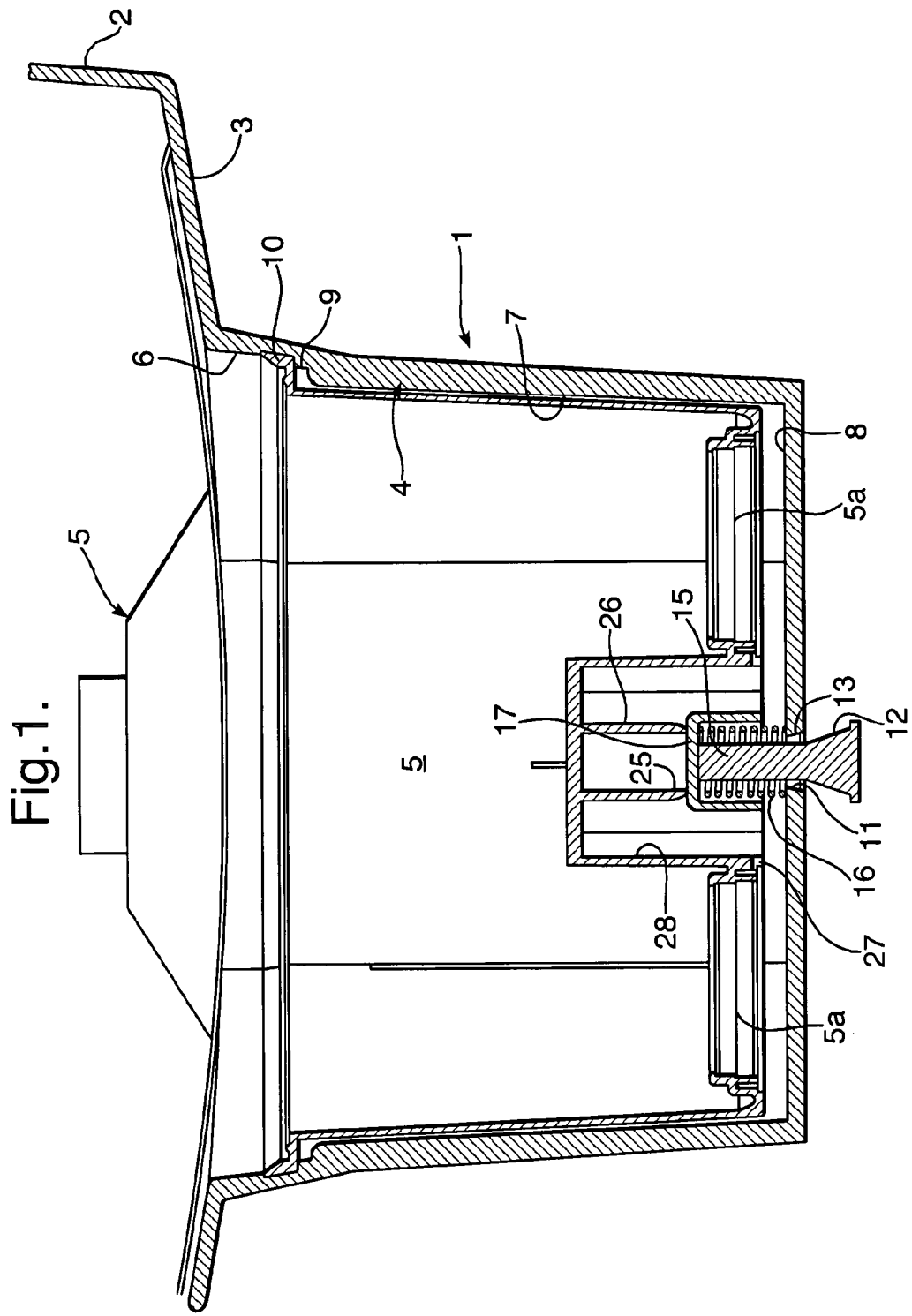
FIG. 1 is a section view of a percolation filtering system with removable cartridge made in accordance with the present invention.

In the figures, reference 1 generally denotes a percolation filtering system with removable cartridge made in accordance with the present invention. The system 1 is only partially represented in the figures, and includes a hopper 2 defining a basin for containing of the water to be filtered, in whose bottom 3 is provided a seat 4 for a cartridge 5. The seat 4 has a mouth 6, a side wall 7 and a bottom 8. In the mouth 6, an annular recess 9 is defined in which a lip 10 of the cartridge 5 is sealingly received when the cartridge 5 is fitted into the seat 4.

An opening 13 is provided in the bottom 8, forming a valve seat 11 for a shutter 12. Overall, the hopper 2, the seat 4, and the opening 13 define a flow path for the water to be filtered which is treated by a filtering bed (not shown) in the cartridge 5 and exits from the cartridge into the seat 4, below the lip 10, through openings 5*a* in the bottom of the cartridge 5. It should be observed that the seat 4 communicates with the basin for the filtered water exclusively through the opening 13, whose interception by the shutter 12 therefore determines the complete interception of the flow path of the water to be filtered.

In the example of FIG. 1, the shutter 12 has a frustoconical shape and is equipped with a stem 15 extended from its smaller base towards the is interior of the seat 4. The shutter is urged by a spring 16, interposed between the bottom of the seat 4 and a plate 17 fit at the free end of the stem 15, towards a normally closed position, in which the valve seat 11 is shut, closing the flow path of the water to be filtered.

Figure 2:
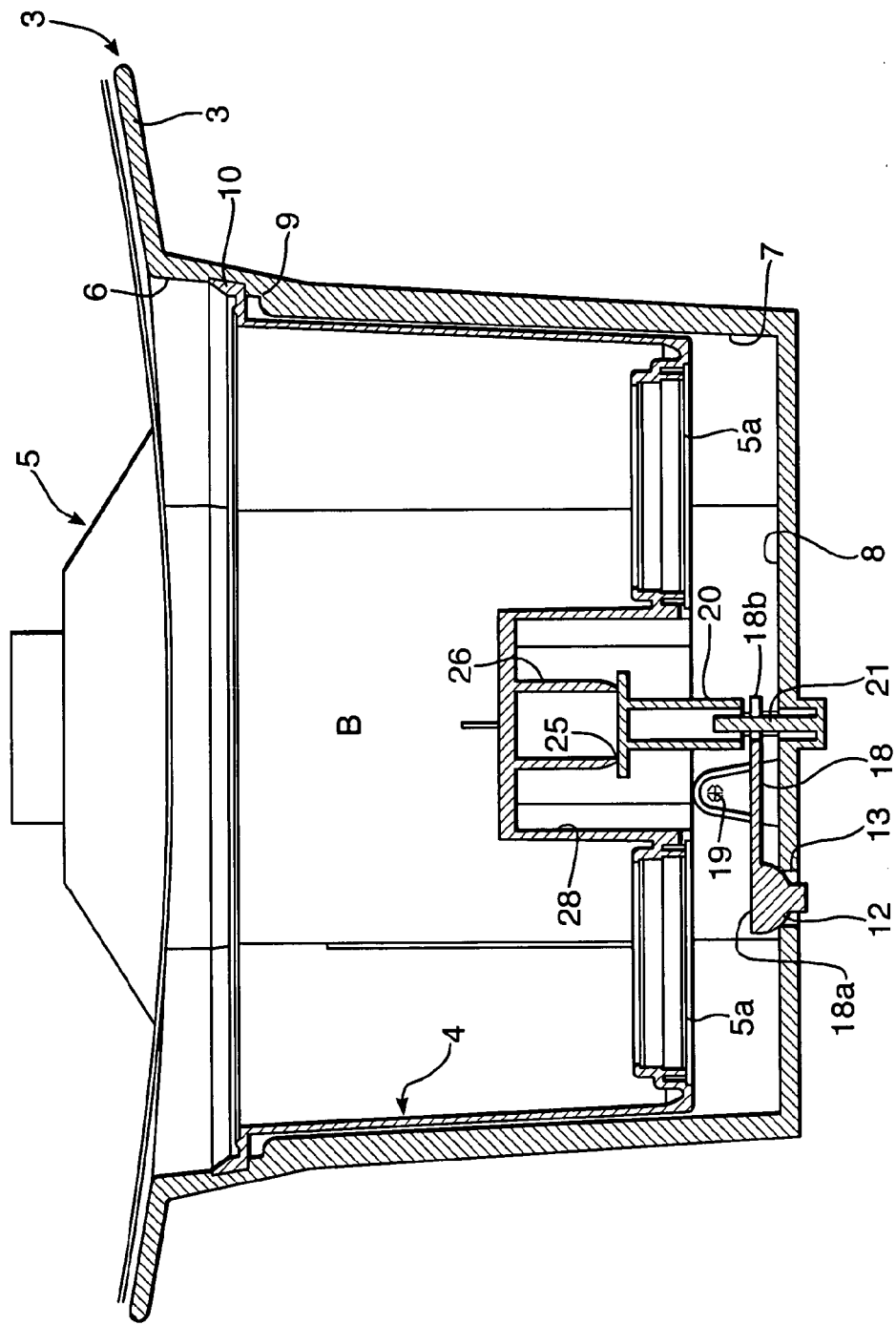
FIG. 2 is a corresponding view of a first alternative embodiment of the system of FIG. 1.

In the example of FIG. 2, the shutter 12 is mounted at one free end 18*a* of a first class lever 18, pivoted at a support 19 erected from the bottom 8 of the seat 4 and whose opposite end 18*b* is subjected to a push-piece 20 guided on an appendage 21 of the bottom 8.

In the example of FIG. 3, the shutter 12 is formed at the upper end of a rod 22 integral with a float 23 and bearing a control appendage 24 passing 25 beyond the opening 13 into the seat 4.

In all indicated cases, the shutter is driven by means of a feeler, including the stem and plate set 15, 17 in the first example, the lever—push-piece set 18, 20 in the second example and the control appendage 24 in the third example, which interferes with an abutment-surface 25 formed at the free end of an appendage 26 projecting from the bottom 27 of the cartridge 5 in a recess 28 which surrounds and receives said appendage 26.

Practically, the shutter 12 with the valve seat 11 form valve means provided to intercept (and normally maintain intercepted) the flow path of the water to be filtered when no cartridge or an unsuitable cartridge is inserted in the seat 4, while the feeler and the corresponding abutment-surface form recognition means and counter-means of the suitability of the cartridge to equip the filtering system, capable of controlling the opening of the flow path by means of driving the valve means upon recognition of the suitability of the cartridge inserted in the seat 4.

The recognition is of geometric type in this case, i.e. based on geometric properties of the cartridge and feeler, such as the reciprocal position thereof, their extension and in general their capacity to interact with each other to control the opening of the valve means when the cartridge 5 is inserted in the seat 4.

It is nevertheless provided that the recognition means and counter-means can be of electric type, such as respective poles 30*a,b* whose reciprocal contact determines the closure of a non-represented circuit to drive the opening of an electric valve 31 which normally intercepts the flow path of the water to be filtered at the opening 13.

Alternatively, it is provided that the recognition means and counter-means can be of the transponder type (FIG. 5), with a transponder 40 placed for example on the side wall or on the bottom of the cartridge 5 and an activation circuit 41 for the transponder provided in a corresponding position in the seat 4. In such a case, it is conveniently provided that the activation circuit 41 and/or the transponder 40 are preferably wireless connected to an electronic circuit 42 provided to activate, by means of micro-actuators 43, a valve 44 of bistable type adapted to allow or block the ventilation of the upper basin 2 by opening or closing a hole 45 made in the upper part of the same or of its cover 46. The upper basin is in this case impermeable to air, except for the possible ventilation permitted by the valve 44. When the ventilation of the upper basin is enabled, the water can flow by gravity through the cartridge, so as to be collected in the lower basin. When on the other hand the ventilation of the upper basin is blocked, the water cannot flow through the cartridge and filtration is therefore restrained.

It is also provided that the electronic circuit 42 controls a valve 47 provided at the opening 13 to intercept the discharge of water from the seat 4 in addition to and/or in substitution of the ventilation control of the upper basin.

It is moreover provided that the circuit 42 controls the emission of an alarm signal, for example by activating a light signal 48 and/or acoustic signal on the cover 46. The same circuit 42 can moreover be provided with counter means to count the time elapsed from the first activation of the cartridge, to signal its depletion at the expiry of a predetermined time period.

Also forming the object of the invention is a method to control a percolation filtering system of the type described above, wherein a recognition of the suitability of said cartridge is carried out when it is inserted in the seat, to enable the filtering system operation following the cartridge's suitability cartridge.

The control method provides that, in the absence of cartridge recognition, one or more of the following controls are activated:
  disabling filling of the basin collecting water upstream of the cartridge,
  disabling of the water passage along the flow path from upstream of the cartridge to downstream of the cartridge,
  disabling pouring water from the water basin downstream of said cartridge, for example by closing, by means of a valve, an outlet duct of the lower water basin, or
  enabling an alarm signal.

It is also contemplated that the same method and system be used to prevent possible use of expired or depleted filter cartridges, for instance including in the data stored in the transponder also an indication of the cartridge expiry date or by changing from time to time the geometry of the cartridge.

The invention thus resolves the proposed problem and attains numerous advantages, including:
  the possibility of using very selective filter cartridges avoiding the risk of confusion;
  offering full guarantee of the cartridge quality with respect to the filtering system,
  the possibility to manufacture and sell different filtering systems and cartridges for different countries and/or pollutants
  the possibility to prevent possible use of expired or depleted products.

The invention claimed is:

1. A percolation filtering system comprising a flow path of water to be filtered including a filter cartridge seat for removably receiving a filter cartridge so that said flow path extends through said filter cartridge when said filter cartridge is inserted into said seat, wherein said system comprises
  a recognition device of the suitability of said cartridge provided on said cartridge and
  a recognition device of the suitability of said cartridge provided on said seat, suitable for reciprocal interaction when the cartridge is inserted in the seat to enable operation of the filtering system following the cartridge's suitability recognition, or to disable it or signal the suitability/unsuitability respectively of the cartridge if the cartridge is recognised/not recognised respectively by the recognition device of the suitability of said cartridge provided on said cartridge;
  wherein said recognition device of the suitability of said cartridge provided on said cartridge and said recognition device of the suitability of said cartridge provided on said seat are connected to a control of the system to activate one or more of the following controls:
    disabling the filling of a water basin of said flow path upstream of said cartridge,
    disabling the water passage along the flow path from upstream of the cartridge to downstream of the cartridge seat,
    disabling pouring of water from a basin of said flow path downstream of said cartridge, and
    generation of an alarm signal;
  wherein the recognition device of the suitability of said cartridge provided on said cartridge and the recognition device of the suitability of said cartridge provided on said seat respectively comprise a sealer associated with a shutter of a valve and an abutment—surface for the sealer, respectively on one and the other of seat and cartridge.

2. The filtering system according to claim 1, wherein: the shutter is urged into a closed position and abuts the valve seat when no recognized cartridge is in the seat, wherein the valve seat is the sole opening of the seat for the cartridge when the cartridge is housed and said seat.

3. The filtering system according to claim 1, wherein the sealer comprises an appendage of the shutter and the abutment—surface is arranged on the cartridge in a position such as to interact with the feeler for opening the shutter when a recognized cartridge is inserted in the seat.

4. The filtering system according to claim 1, wherein the recognition device of the suitability of said cartridge provided on said cartridge and the recognition device of the suitability of said cartridge provided on said seat, are of geometric recognition type.

5. The filtering system according to claim 1, wherein said control for disabling water passage along the flow path from upstream of the cartridge to downstream of the cartridge seat comprises the valve to intercept the flow path between said seat and a water basin downstream of said cartridge, to selectively intercept said passage in the absence of recognition of the cartridge when it is inserted in the seat.

* * * * *